United States Patent
Ramsay

(10) Patent No.: US 10,254,824 B2
(45) Date of Patent: Apr. 9, 2019

(54) SYSTEMS AND METHODS FOR OUTPUT OF CONTENT BASED ON SENSING AN ENVIRONMENTAL FACTOR

(75) Inventor: Erin Ramsay, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 1098 days.

(21) Appl. No.: 12/580,630

(22) Filed: Oct. 16, 2009

(65) Prior Publication Data

US 2011/0093100 A1 Apr. 21, 2011

(51) Int. Cl.
| | |
|---|---|
| *G06F 3/01* | (2006.01) |
| *G10H 1/00* | (2006.01) |
| *G06F 17/30* | (2006.01) |
| *G11B 27/10* | (2006.01) |

(52) U.S. Cl.
CPC ........ *G06F 3/011* (2013.01); *G06F 17/30761* (2013.01); *G10H 1/0008* (2013.01); *G11B 27/105* (2013.01); *G10H 2210/381* (2013.01); *G10H 2220/351* (2013.01); *G10H 2220/371* (2013.01); *G10H 2220/395* (2013.01); *G10H 2240/081* (2013.01); *G10H 2240/131* (2013.01)

(58) Field of Classification Search
USPC ........... 700/94; 715/760; 705/2, 27; 600/519
See application file for complete search history.

(56) References Cited

U.S. PATENT DOCUMENTS

| | | | |
|---|---|---|---|
| 2006/0167576 A1* | 7/2006 | Rosenberg | 700/94 |
| 2007/0074618 A1* | 4/2007 | Vergo | G10H 1/00 84/612 |
| 2007/0118043 A1* | 5/2007 | Oliver et al. | 600/519 |
| 2008/0051919 A1* | 2/2008 | Sakai et al. | 700/94 |
| 2008/0097633 A1* | 4/2008 | Jochelson et al. | 700/94 |
| 2009/0088877 A1* | 4/2009 | Terauchi et al. | 700/94 |
| 2011/0022594 A1* | 1/2011 | Takatsuka et al. | 707/737 |

FOREIGN PATENT DOCUMENTS

| | | | |
|---|---|---|---|
| WO | WO/2006/114998 | * | 11/2006 |
| WO | WO/2007/081048 | * | 1/2007 |

* cited by examiner

*Primary Examiner* — Andrew C Flanders
(74) *Attorney, Agent, or Firm* — Kilpatrick Townsend & Stockton LLP

(57) ABSTRACT

An audio playback device may be capable of operating in a "shuffle" mode in which audio or other content items are randomly selected. Environmental factor(s) such as ambient conditions or forces applied to the device or a peripheral can be used to identify one or more subsets of available content items from which content items are selected to thereby provide an "ambient shuffle" mode. By including or excluding items from the subset, the randomly-selected content items may more likely match the conditions under which the playback device is operating and/or match input provided by a user via tapping on, shaking, or otherwise applying force to the device or components in communication with the device.

11 Claims, 4 Drawing Sheets

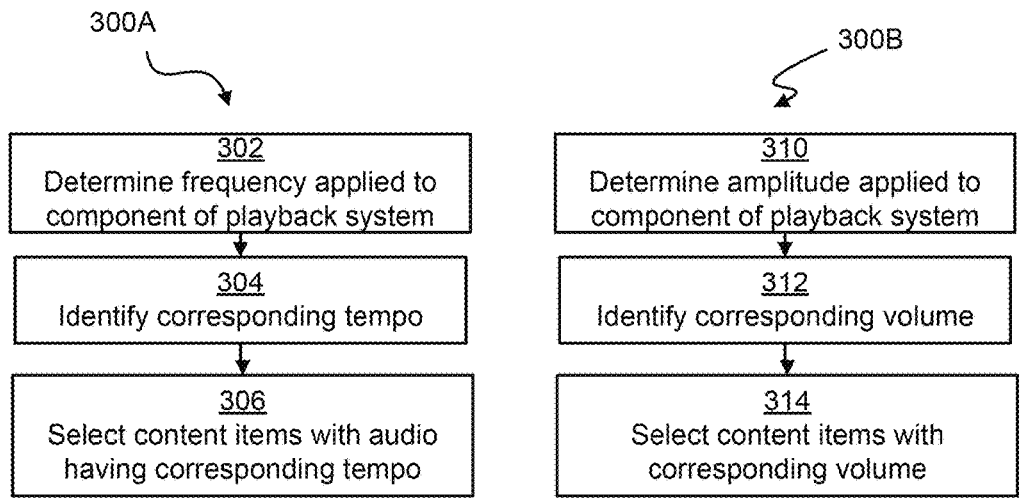

| Environmental Factor | Value Range | Selection Criteria |
|---|---|---|
| force applied to component | a < frequency < b | A < BPM < B |
| force applied to component | c < amplitude < d | C < Volume < D |
| calculated motion of component | e < pace < f | 1.8*E < BPM < 2.1*F |
| ambient audio | g < tempo < h | G < BPM < H |
| directed audio | i < tempo < j | I < BPM < J |
| heart rate | k < rate < l | genre = "techno" |
| heart rate | m < rate < n | genre = "classical" |
| calculated motion of component | value > 0 | genre = NOT ("finnish") |

Figure 4

SYSTEMS AND METHODS FOR OUTPUT OF CONTENT BASED ON SENSING AN ENVIRONMENTAL FACTOR

BACKGROUND

Presently, various content playback devices are available. For instance, portable or wearable computing devices can include a processor, storage, and suitable output components to deliver audio content to users via headphones, ear buds, speakers, or other mechanisms. The audio content may comprise some or all of a media presentation—for example, the media may comprise a video with accompanying audio, an audio file, a game, etc. Some devices operate in what is commonly referred to as "shuffle" mode in which audio or other content items are randomly selected for playback in order to add variety to a user's playback session or to avoid the need for input.

Despite its conveniences, "shuffle" mode has drawbacks—certain audio or other content items may be unsuitable for a given scenario but may be selected anyway. As an example, a user may include a variety of content items on a playback device including music and spoken word (e.g., foreign language lessons). The music may be suitable for a workout session, while the spoken word may be an annoyance if randomly encountered during the workout. Although the user may of course move items to and from the playback device between sessions, this may be inconvenient at best.

SUMMARY

Embodiments of the present invention provide systems and methods for selecting content for output based on sensing an environmental factor or factors at the time content items are to be played back.

In one embodiment, a method comprises sensing an environmental factor representing at least one of an ambient condition or a force applied to a component of a playback device. For example, the environmental factor may represent motion of a component of an audio playback device, a condition at or near the audio playback device, a condition of a user of the audio playback device, and/or a force applied to the audio playback device. The method can further comprise using the environmental factor(s) to bias selection during a shuffle mode. For example, the method can comprise identifying a subset of a plurality of content items available to the playback device based on sensing the environmental factor and configuring the playback device to select a content item or items from the subset for playback. As another example, weightings or other parameters used by a shuffle algorithm can be adjusted to favor selection of the content items of the subset and/or to avoid selection of content items outside the subset.

For example, an audio playback device may be capable of operating in a "shuffle" mode in which audio or other content items are randomly selected. The environmental factor(s) can be used to identify one or more subsets of available content items from which content items are selected to thereby provide an "ambient shuffle" mode. By including or excluding items from the subset, the randomly-selected content items may more likely match the conditions under which the playback device is operating and/or match input provided by a user via tapping on, shaking, or otherwise applying force to the device or components in communication with the device.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIGS. 3A and 3B are each a flowchart showing illustrative steps in a method for selecting audio content for output based on sensing frequency and/or amplitude of force applied to a component of an audio playback system in one embodiment of the present invention.

FIG. 4 is a diagram showing an illustrative mapping of environmental factors to selection criteria for selecting content for output in one embodiment of the present invention.

DETAILED DESCRIPTION

Figure 1:
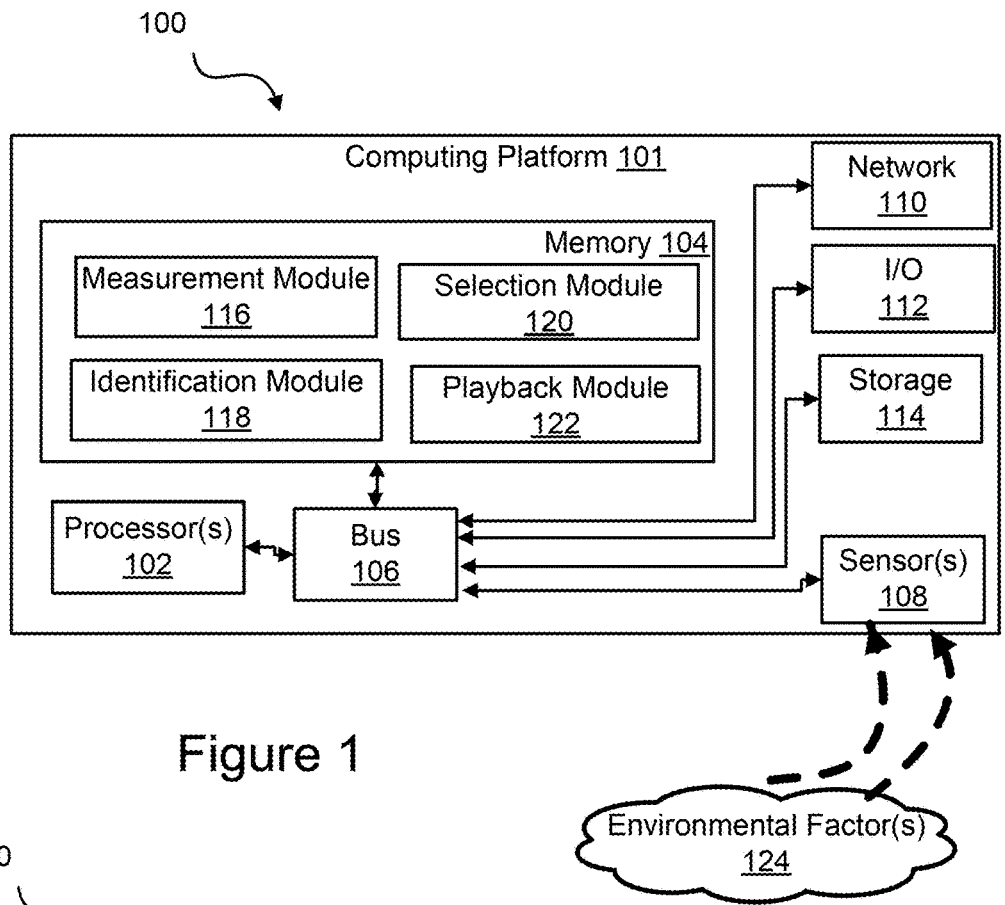
FIG. 1 is a diagram of an illustrative system for selecting content for output based on sensing one or more environmental factors in one embodiment of the present invention.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of Selecting Content for Output Based on Sensing an Environmental Factor or Factors One illustrative embodiment of the present invention comprises a computing system such as an iPod® portable music device or iPhone® mobile device, both available from Apple Inc. of Cupertino, Calif., or a Zune(R) portable device, available from Microsoft Corporation of Redmond, Wash. The computing system can include and/or may be in communication with one or more sensors, such as an accelerometer. Suitable control software can be included to provide an ambient shuffle mode, which draws on one or more subsets of content items available for playback. The content items may, for example, comprise music and/or video content items stored in solid state or other memory of the computing system. As another example, the content items may comprise streams of available content (e.g., Internet radio).

Each content item may have metadata that describes one or more aspects of the content item. For example, metadata for an audio content item may include an "artist" tag, an "album" tag, "genre" tag, a "volume" tag, and/or "a beats per minute" (BPM) tag. The respective values of the tags can identify the recording artist, the album, the genre, the relative loudness, and the tempo of the song(s) or other content in the audio content item.

The computing system can access mapping data for correlating a value or range of values for one or more sensed environmental factors to values or ranges of values for metadata items. For example, the mapping data may comprise one or more rules for including (or excluding) content items from a subset of content items from which the computing system selects items for output during an ambient shuffle mode.

As an example, the mapping data may comprise rules that map certain genres and BPM values to motion of the playback device or force applied to the playback device as determined using the accelerometer. For instance, if the accelerometer data indicates that the device is moving at a certain frequency or pace, audio items with BPM values at or near the frequency/pace may be included in the subset, while slower or faster items are excluded. As another example, different frequencies/paces may be mapped to different ranges of BPM values. If the accelerometer data indicates any motion at all, certain genres, such as spoken word, may be categorically excluded. This can, for example, ensure that the user encounters "high energy" music while jogging, but not slower music or spoken-word content.

This illustrative example is given to introduce the reader to the general subject matter discussed herein. The invention is not limited to this example. The following sections describe various additional non-limiting embodiments and examples.

Illustrative Systems for Selecting Content for Output Based on Sensing an Environmental Factor or Factors FIG. 1 is a diagram of an illustrative computing system 100 for selecting content for output based on sensing one or more environmental factors. In this example, computing system 100 comprises one or more processors 102, a memory 104 in communication with the processor via a bus 106, and a sensor 108 also in communication with processor 102 via bus 106. Further components in this example include network interface 110, I/O components 112, and storage components 114.

Network interface 110 may comprise one or more components or modules for facilitating connection between system 100 and one or more other computing systems and/or additional components. For example, network interface 110 may comprise a wireless or RF assembly to enable communications on a cellular network, a local wireless network (e.g., IEEE 802.11a, b, g, n), a wide area wireless network (e.g. IEEE 802.16 ("Wi-Max")), or a Bluetooth network. As another example, network interface 110 may comprise components for interfacing computing system 100 via a wired connection, such as a USB or Ethernet interface to transfer data to and from the device.

I/O components 112 can comprise one or more components for receiving user input and providing output. For example, in one embodiment, I/O components 112 can comprise a D/A converter and amplifier for providing audio output. As another example, I/O components 112 can comprise a video or other display and/or an interface for providing input. For instance, computing system 100 may include one or more keys or buttons or a touch-screen interface. As another example, I/O components 112 can comprise one or more actuators for providing haptic effects.

Storage 114 can comprise one or more computer-readable media from which content items are accessible. For example, storage 114 may comprise a solid-state or magnetic disk drive. Storage 114 may include an interface for reading removable media (e.g., SD card, USB key, etc.). In this example, storage 114 is local to computing platform 101. However, in some embodiments, content items are accessed from remotely-accessible storage in addition to or instead of local storage.

Computing system 100 is intended to be illustrative and non-limiting. For example, in some embodiments, computing platform 101 includes no I/O components apart from audio output components and a single USB or other interface for moving data to and from the device. As another example, the device may not include separate storage 114; rather, all content items may reside in memory 104 and/or may be accessed as needed from a network connection as mentioned above.

The computing system may support other operating modes not discussed in detail herein—for example, a user may define and select playlists, select particular albums, artists, genres, etc. in other modes. Additionally, computing system 100 may include applications and other program components other than those used to provide playback of content. For example, memory 104 may embody an operating system for the device and one or more applications (e.g., email, games, calendar, etc.).

In this example, memory 104 includes program components that configure computing system 100 to provide an ambient shuffle mode for content playback. These components include a measurement module 116 that configures the computing system to use sensor 108 to sense an environmental factor shown generally at 124. The environmental factor can represent at least one of an ambient condition or a force applied to the sensor. The program components also include an identification module 118 that configures the computing system to use the environmental factor and data associated with a plurality of available audio content items to identify a subset of the available content items for selection during a shuffle mode. For example, as detailed below, content items characteristics can be correlated by configuration data to environmental factor values and/or user states and identification module 118 can use the configuration data to bias selections during shuffle mode.

Selection module 120 configures the computing system to select an audio content item from the subset of audio content items, while an audio playback module 122 configures the playback system to access data representing the selected audio content item and use the data to provide audio or other output.

This example depicts a single sensor 108. It will be understood that in some embodiments multiple sensors can be used. Additionally, the sensor may be housed in the same component as the other components of the computing system or in a separate component. For example, in some embodiments, the processor, memory, and sensor are all comprised in a portable music player or wearable device. On the other hand, in some embodiments, the sensor is placed in component separate from another component that houses the memory and/or processor. For instance, a wearable sensor may be in communication with the processor and memory or a portable music player or wearable device via a wired or wireless connection. As another example, computing platform 101 may comprise a computing system such as a personal computer, game system, or media device (e.g., television, set-top box, stereo system), with one or more sensors 108 included in a peripheral device such as a mouse or other pointing device or a remote control.

Sensor 108 can comprise any number or type of sensing components. As an example, sensor 108 may comprise an accelerometer or gyroscope. A non-limiting list of examples of sensors and environmental factors is provided below:

TABLE 1

Exemplary Sensors and Factors

| Sensor | Environmental Factor Sensed |
| --- | --- |
| Accelerometer | Force in one, two, or three directions |
| Altimeter | Altitude |
| Thermometer | Ambient temperature; user body temperature |
| Heart rate monitor | Heart rate of device user |
| Skin resistance monitor | Skin resistance of device user |
| Oxygen sensor | Oxygen use of device user |
| Audio sensor/microphone | Ambient audio and/or audio generated by device user |
| Photosensor | Ambient light |
| IR/Photosensor | User eye movement, position, body temperature |
| Hygrometer | Relative humidity |
| Speedometer | Velocity |
| Pedometer/odometer | Distance traveled |
| chronometer | time of day, date |

Environmental factors can include any of the environmental factors noted above or any other quantities representative of an ambient condition or force applied to or directed to the playback device. Additionally, environmental factors may be evaluated directly from sensor data or may be processed by the device to derive other environmental factors. For example, acceleration data may be used to determine a device velocity and/or a pattern of motion. As another example, altitude data and/or acceleration data may be used to determine a vertical speed for the device or a state (e.g., climbing a hill, descending a hill, etc.). As a further example, physiological data such as heart rate, skin resistance, and other factors can be used to determine a physiological state of a device user (e.g., awake, stressed, asleep, REM sleep, etc.). Use of environmental factors for selecting content is discussed in further detail below.

Figure 2:
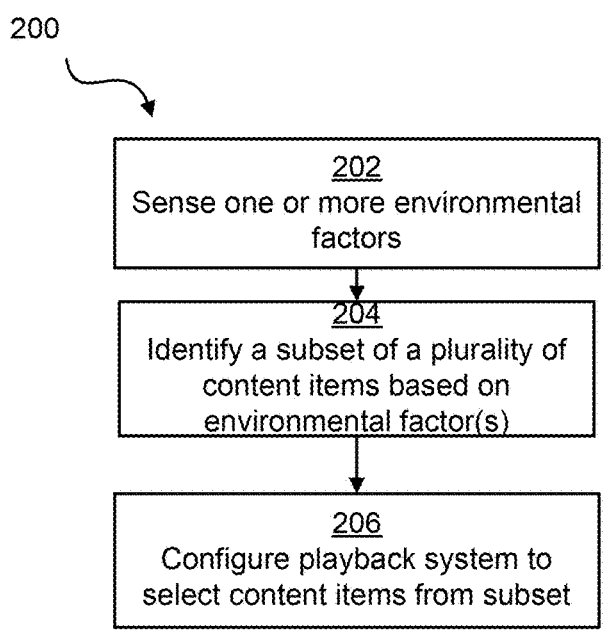
FIG. 2 is a flowchart showing illustrative steps in a method for selecting content for output based on sensing one or more environmental factors in one embodiment of the present invention.

Illustrative Methods for Selecting Content for Output Based on Sensing an Environmental Factor or Factors FIG. 2 is a flowchart showing illustrative steps in a method 200 for selecting content for output based on sensing one or more environmental factors. Block 202 represents sensing one or more environmental factors. For example, in the example of system 100 in FIG. 1, measurement module 116 can carry out this step by reading a value for one or more sensors 108 at one or more points in time and storing the values in memory. Sensing an environmental factor may involve filtering or other techniques to ensure good data. For example, if motion is determined over a time interval, a fast Fourier transform (FFT) or another filter may be used to remove peaks (e.g., bounces from bumps in a road while in a vehicle).

Block 204 represents identifying a subset of a plurality of content items available to the playback device based on sensing the environmental factor. In system 100 of FIG. 1, identification module 118 may carry out this step by using a ruleset. For example, the ruleset can map one or more environmental factor values or value ranges to one or more metadata values for use in including or excluding content items in the subset. As another example, combination s of values, patterns of values, and the like can be used to infer a state and the state can be correlated to metadata values for use in including or excluding items from the subset. Data identifying the subset can be stored in memory—for instance, a list of available content items can be stored or flags may be set for use in identifying which content items are to be used (or not used).

Block 206 represents configuring the audio playback system to select a content item or items from the subset for playback. For example, selection module 120 and playback module 122 may carry out this step in example system 100 of FIG. 1 by using a random selection algorithm and suitable playback algorithms to access data representing a content item and converting the data to suitable audio or other signals to provide output.

In this example, the environmental factor(s) bias selection by defining the content of one or more subsets of content items, which are then randomly selected in shuffle mode. It will be appreciated that other biasing techniques could be used. For example, rather than excluding or including items in a subset, each item could have a bias value that is increased or decreased based on a sensed environmental factor so that the likelihood of selection goes up or down accordingly.

The actual manner of biasing can be adjusted to accommodate the particular implementation of shuffle mode for the device. For example, if the shuffle mode relies on selections based on correlating content items to numbers produced by a random number generator, then if a random number correlates to a content item outside the subset, a new number can be generated.

Biasing may relative to any playback state. For example, the biasing may be relative to "normal" shuffle mode in which any available content item would be selected, but for the biasing. However, embodiments also include adjustments to shuffle operations that are biased already. For example, a user may specify for shuffle selections to be biased for faster music in any event, with further biasing from environmental/other factors resulting in the (normal) faster music or extremely high-tempo music, but no moderate tempo or slow music.

FIGS. 3A and 3B are each a flowchart showing illustrative steps in a method for selecting audio content for output based on sensing frequency and/or amplitude of force applied to a component of an audio playback system. Turning first to FIG. 3A, a method 300A for selecting content items based on correlating frequency as sensed by the playback system to tempo of audio content items will be discussed.

Block 302 represents determining a frequency applied to a component of the playback system. For example, the frequency of a force applied directly to a playback device or sensing component thereof may be evaluated. As another example, the frequency may be determined based on motion of the device. For instance, a pattern of motion may be determined by sampling forces applied to the device over a time interval, with a pace or cadence derived from the pattern and corresponding to the frequency. The pace/cadence may represent, for example, a user's rate of walking, jogging, or running.

Block 304 represents identifying a tempo corresponding to the frequency. This can depend on the mapping rule(s)

accessed by the playback device. For example, the rules may provide for audio content having a certain tempo as expressed in BPM or BPM range to be used (or excluded) when the user's pace/cadence falls within a certain range, above a given value, or below a given value. For example, the rules may provide that music with a high BPM is to be chosen if the pace is below a first threshold value. The rules may provide that, if the pace is above the first threshold value but below a second threshold value, music with a BPM at or near the pace (e.g., as expressed by a threshold, such as plus or minus 5%) is to be chosen. If the pace exceeds the threshold, music with a low BPM is to be chosen. The BPM value may be a multiple of the frequency or may match the frequency.

In some embodiments, there is no direct correlation between the BPM value and the frequency of the force or pace as determined from the force. For example, the rules may simply provide one or more ranges of paces/frequencies and corresponding BPM ranges or values. This may, for example, allow a user to specify "fast" music to be played when running or jogging (as inferred from pace) and "slow" music while walking.

Block 306 represents selecting content items with a corresponding tempo. For example, the content items may have associated metadata that includes a BPM tag or other information representative of the tempo that can be correlated to the BPM value(s) set forth in the rules. If a BPM tag or other information is not available, other components of the playback device may analyze the audio content to determine the tempo or such data can be requested over a network connection, if available. For example, the playback device may use suitable algorithms to analyze content on the fly, such as analyzing content streaming to the device or analyzing files of the device one-by-one as they are loaded or accessed. In any event, audio content items with suitable tempos can be identified for playback and/or identified for skipping. A "shuffle" algorithm can rely on the playback/skipping identifications and randomly select content items accordingly.

FIG. 3B depicts a method 300B for selecting items based on correlating an amplitude of applied force to volume. Block 310 represents determining an amplitude applied to a component of a playback system. For example, the amplitude of a force applied to an accelerometer may be sensed in response to direct input, such as a user tapping on a device or peripheral containing the accelerometer. As another example, the amplitude may be sensed in response to indirect input, such as a user's motion—walking may result in lower amplitudes than jogging or running.

At block 312, a volume or loudness corresponding to the amplitude is determined. Similar to the case of frequency-based playback selection, the volume determination can depend on the mapping rules specified for the device. As an example, amplitude ranges may be mapped to volume ranges (e.g., "soft," "medium," and "loud") or the corresponding volume may be a multiple of the sensed amplitude. At block 314, content items with the corresponding volume can be selected. For example, content items may include header data or other metadata indicating a volume level in decibels and/or a descriptive tag. For instance, "loud" songs may be labeled as such and/or may have a volume range specified in the mapping rules. If the sensed amplitude correlates to the "loud" volume, then "loud" songs may be included in the subset from which content items are selected in shuffle mode.

In the examples above, frequency of a force applied to the playback system was mapped to tempo and amplitude of the force was mapped to volume. However, more complex mappings can be used and additional processing can be performed. For instance, a pattern of force can be sampled over a time interval to yield a waveform and the frequency and amplitude of the waveform can be analyzed to select content items. The average amplitude/frequency can then be used to select content items by tempo, volume, combinations thereof, and/or another factor. For instance, a frequency/amplitude pattern that corresponds to fast movement may be mapped to loud, fast songs while a pattern that corresponds to slow movement may be mapped to softer, slower songs.

FIG. 4 is a diagram showing an illustrative mapping 400 of environmental factors to selection criteria for selecting content for output. In this example, environmental factors are shown at column 402, value ranges are shown at 404, and selection criteria for content items are shown at 406. A plurality of rows 408-422 provide examples discussed below.

At row 408, a mapping correlates a range (a, b) of a frequency of a force applied to a component (e.g., an accelerometer) to a range of BPM values for content items. If the frequency falls between values a and b, then songs with a BPM value between A and B will be biased for playback. The use of upper and lower case values is not meant to imply a relationship between the value ranges and selection criteria; for instance, a and A could be multiples of one another or could have no correlation whatsoever outside of the mapping.

Row 410 illustrates correlating a range (c, d) of amplitudes to a range of volumes between C and D. Row 412 illustrates an example of correlating a range of paces as determined from calculated motion of a component to a range of BPM values. In this example, the BPM values are expressed as functions of factors E and F to illustrate that the selection criteria may involve expressions to be evaluated by the playback device.

Row 414 illustrates correlating a range of tempo for ambient audio to a range of BPM values. For example, if a user is in an environment with sound having a tempo between the values g and h, then songs with a BPM value between G and H may be selected. Similarly, row 416 illustrates that directed audio (e.g., user humming, singing, beat generation) can be analyzed, in this particular example, the tempo of the directed audio is used as an input for selecting items based on BPM values.

Rows 418, 420, and 422 illustrate mappings by genre. Particularly, rows 418 and 420 map different ranges of heart rate values to different genres. Row 422 illustrates a Boolean expression as a selection criterion. Namely, if any motion is indicated, then "Finnish" items (e.g., language instruction podcasts) are excluded from consideration. Although column 404 illustrates value ranges, single values or Boolean expressions could be used in addition to or instead of value ranges. For instance, the mapping in row 422 could be expressed as "Genre=NOT 'Finnish' IF Motion=TRUE."

Figure 5:
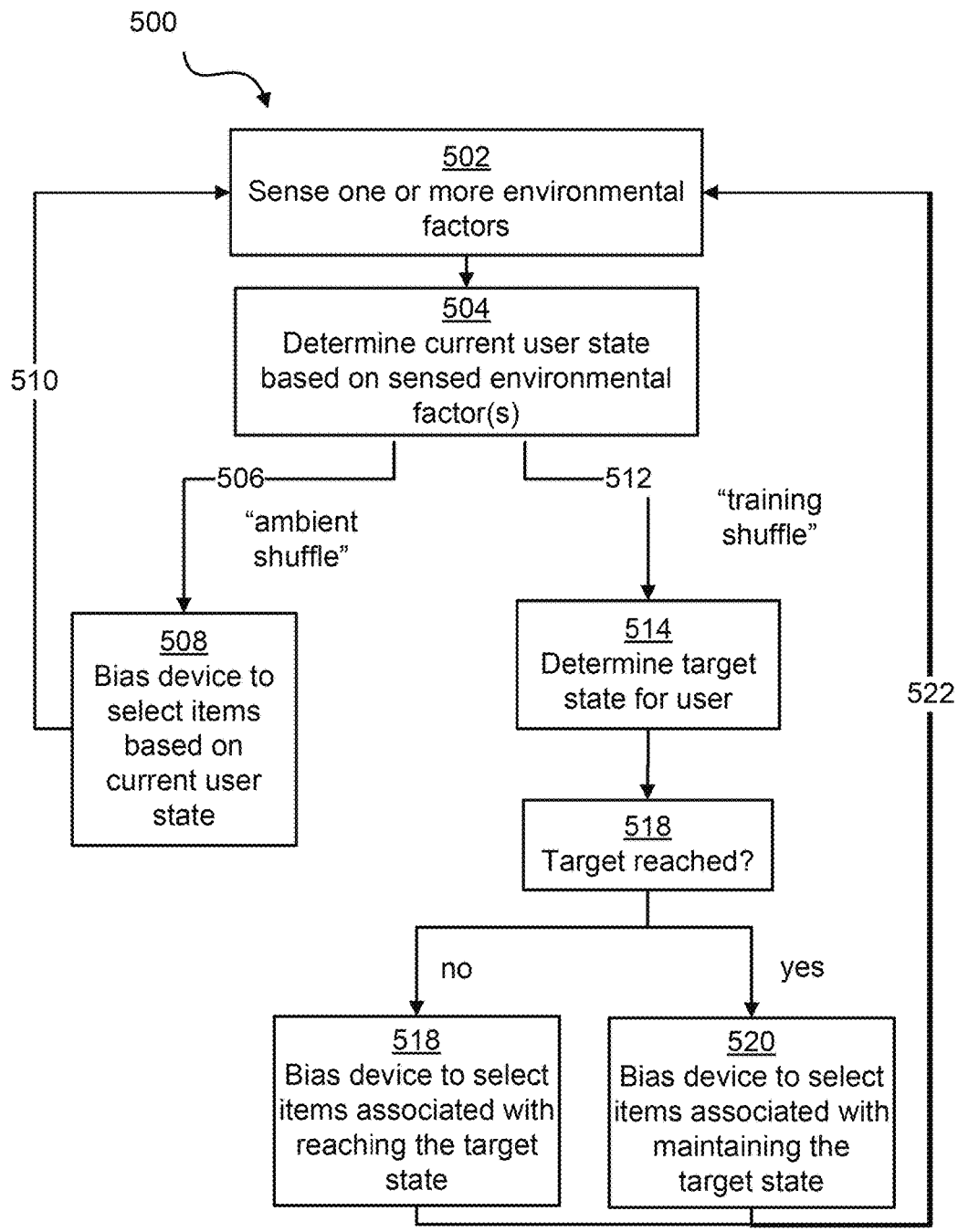
FIG. 5 is a flowchart showing an illustrative method for selecting content items based on determining a state of a user of a playback device in one embodiment of the present invention.

FIG. 5 is a flowchart showing an illustrative method 500 for selecting content items based on determining a state of a user of a playback device. As was mentioned above, sensor values can be directly correlated to content item metadata and/or may be used to infer information about a user, with the information then used to select content items. Block 502 represents using one or more sensors to determine an environmental factor. As mentioned earlier, the environmental factor may represent a force applied to a sensor directly or indirectly, an ambient condition, or a physiological statistic of a user such as heart rate, skin resistance, oxygen use, etc.

Block 504 represents determining a user state based on the sensed environmental factor(s). In some embodiments, the playback device determines the user's current state using rulesets, mappings, or pattern information that correlates sensed values and/or a pattern of sensed values over time for one or more environmental factors to current state values.

As an example, device displacement may be determined from sensed force values and then analyzed to determine if the user is stationary, walking, jogging, running, or otherwise in motion and the user's velocity. The state may also indicate if the user's speed is steady, decreasing, or increasing. Other motion profiles can be considered—for example, a change in altitude may indicate that a user is ascending or descending a hill. As another example, a user's stress level may be inferred from a pattern of motion and/or physiological statistics such as heart rate and skin resistance. As a further example, in some embodiments, the user's sleep state (e.g., awake, asleep, REM sleep) is determined based on physiological statistics such as eye motion, skin resistance, heart rate, and other indicators as known in the art.

As shown at branch 506 and block 508, the playback device can be biased based on the user's current state. For example, a user's current state may be "running, velocity=2.7 m/s, delta-v=0." A mapping or ruleset can be used to identify content items for selection or exclusion from selection based on the user's state of running at a steady pace.

In some embodiments, the biasing is updated by looping back to block 502, as indicated by arrow 510, until an exit event occurs (e.g., device shutdown, switch from shuffle mode, etc.). Accordingly, the playback device's selections can change to match the current state. For example, if a user slows to a walk from a run, the resulting selections may switch from fast-paced, louder music to slower, quieter music.

As shown at branch 512 of FIG. 5, a playback device can alternatively perform further steps to select content items so that the user's state moves towards a target state. For example, in some embodiments, the playback device may support different "shuffle" modes: an "ambient shuffle" mode may use a ruleset that provides for selection of items based on currently-sensed environmental factors and/or current state data only, while a "training shuffle" mode may use a ruleset that provides for selection of items to move the user towards a target state.

Block 514 represents determining a target state for the user. The target state may be represented by data generated in response to user inputs to the playback device and/or data downloaded to the playback device from elsewhere. Block 516 represents determining if the target state has been reached. If not, then the flow moves to block 518, which represents biasing the device to select items associated with reaching the target state. As indicated at 522, the flow can return to block 502 until a termination event occurs so that the current state and biasing are continually updated.

If at block 516, the target state has been reached, then as shown at block 520 the device is biased to select content items associated with maintaining the target state. Some or all of the same content items may be associated with reaching and maintaining the target state or different items may be used, depending on the mapping/ruleset used.

For instance, the user may specify data indicating a target state defining a desired pace and duration for running. If the current state does not match the target state, then the playback device may be biased to select items that will move the user toward the target state. For example, if the current state indicates the user is running at a pace that is below a pace specified in the target state, faster music may be identified for selection by the shuffle algorithm. Once the target pace is reached, music associated with the target pace can be played back. As another example, a user may configure the playback device to "slow down" the user if he or she exceeds a target heart rate or running/jogging pace by changing the speed or type of music played back.

Target states may be expressed in the mapping rules as a function of multiple states and values. For example, for a target state of "Walk," music of certain genres and/or certain BPM ranges may be associated with reaching the "Walk" state and the shuffle algorithm can be biased accordingly as noted above. For instance, slower music or spoken word items may be biased for selection by the shuffle algorithms. Depending on the mapping rules, the resulting music or other content may be the same as would be played if the current state was "walk," or the music may differ.

Sequences of states can be specified in some embodiments. For instance, a series of target states for a workout may comprise a "warm-up" state with an initial pace and heart rate followed by a "workout" state with a second pace, heart rate, and duration, and then a "cool down" state with a third pace and heart rate. The playback device can step through the states once the specified targets are reached to assist in the user's workout by providing corresponding output. Sequences of states and changes may be specified as functions of a current state and/or particular environmental factor values. For instance, the mapping rules may use Boolean logic as noted below to change the target state based on the current state and a heart rate value:

Target State="Walk" IF (Current State="Running" and Heart Rate>="135") Accordingly, the biasing may be changed to slow down the user via slower music, sound effects (e.g., white noise), and the like.

The examples above referred to mappings and rulesets used to evaluate user state and used to correlate states/environmental factor values to selection criteria. The mappings and rulesets can be specified in any suitable manner. For example, a device may include a user interface such as a screen, buttons, and the like that enables a user to select environmental factors to sense and specify which value ranges correspond to desired properties of content items. As another example, the interface may be provided by an application executed on another computing system that generates one or more configuration files that are then provided to the playback device.

In some embodiments, regardless of the source of the configuration files, the mapping and rulesets are updated based on user feedback. For example, adaptive algorithms may determine when a user skips a song or other content item that is selected from the biased selections in order to influence future selections. For instance, if an initial BPM range is correlated to a running pace or tapping frequency but songs on the upper (and/or lower) end(s) of the range are skipped, then the initial BPM range may be trimmed to exclude skipped songs in the future.

The playback device, in some embodiments, can track usage and selection data. For instance, the resulting content items that are played back can be tracked along with number of playbacks, user activity at playback (e.g., skipping, replay), and other information. Biasing activity can be tracked as well—the playback device may make correlations selected by users available for use by multiple users and/or other parties.

Embodiments configured in accordance with the present subject matter can offer advantages in at least some situations. For example, a user's experience with a playback device may be enhanced by reducing or avoiding random selection of content items that are inappropriate for a given situation and preventing the need for the user to manually intervene. Additionally, the utility of a playback device can be enhanced by supporting a shuffle mode that biases its selections based on comparing a current state to a target state.

As a further example, since sensing environmental factors may substitute for device controls, operating the device may be simplified—a user may simply tap on a device to indicate desired tempos and/or volumes or other criteria for selection of items rather than navigating through a tree of menus or moving content items to/from the device.

Figure 6:
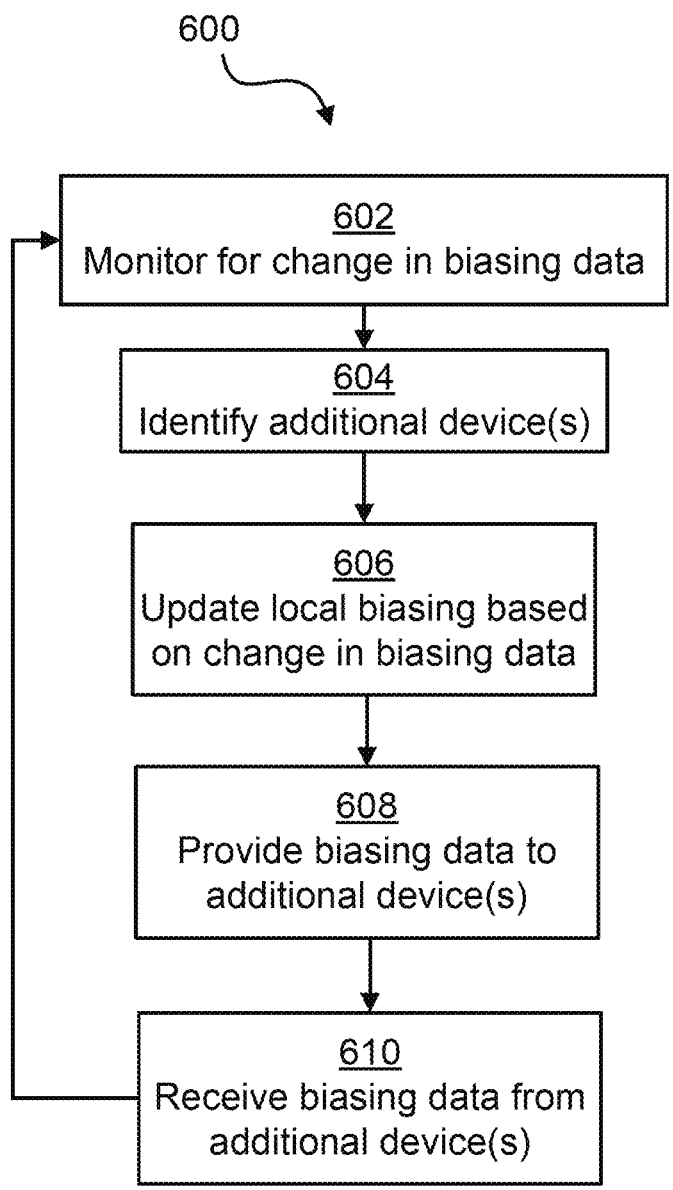
FIG. 6 is a flowchart showing an illustrative method for cross-device biasing.

FIG. 6 is a flowchart showing an illustrative method 600 for cross-device biasing. Block 602 represents monitoring for a change in local biasing data (i.e., sensed environmental factors, user and other states, and/or other input). In single-device operation, the method would move to block 606, in which local biasing is updated (e.g., weightings, subsets, etc. adjusted to influence selections).

However, in this example, block 604 is included. Block 604 represents identifying additional devices in communication with the local playback device. For example, a music player may include wireless connectivity that allows the player to interface with other playback devices to exchange biasing and other information. In this example, in addition to updating local biasing behavior, the method includes providing biasing data to additional devices as shown at block 608 and receiving biasing data from the additional devices. Of course, devices could operate in a "provide-only" or "receive only" mode in which biasing data is either provided or received, but not both. In some embodiments, a device may be configured to operate in "follow-only" mode in which all biasing is determined from data received from other devices.

Cross-device biasing can allow one or more devices in communication with one another to broadcast biasing data to influence selections of other devices. For instance, the biasing data could comprise data identifying a currently-selected content item or subset of items. As another example, the biasing data could comprise data identifying an environmental factor or state at a first device and provided to one or more second devices.

As an example of cross-device biasing, a first device user may be running with several other device users. If the first user's pace increases during a song, sensed environmental factors (e.g., the first user's pace as sensed, heartbeat, speed, etc.) may influence selections at the first user's device (e.g., "fast" music, music with a tempo at or near the pace, "slower" music if the pace is too high). Biasing data can be sent to the other users to influence their selections. For example, the biasing data may simply comprise sensed data from the first user, other data (e.g., a BPM range) used in controlling selections at the first user's device, or even the song(s) selected in response to the data at the first device.

Several examples above were presented in the context of a portable media playback device carried by a user, e.g., while walking, jogging, etc. However, the present subject matter includes embodiments in which the media playback device is used alongside or is integrated into another apparatus. The additional apparatus can be relied on for environmental factor and other data.

For example, a user may operate a media playback device in an automobile, while on a bicycle, or while using another vehicle. The playback device may rely on sensor data from the vehicle, with data indicating a vehicle condition or state may be used alongside or instead of other sensed data. For instance, a user in a convertible automobile may configure a playback device to bias shuffle selections based on the time of day, average vehicle speed, and state data indicating whether the convertible top is up or down. This may result in different selections during 6 o'clock stop-and-go traffic as compared to moderate-to-high speed driving on a highway.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a shuffle algorithm, sensor reading algorithm, and biasing algorithm to influence the shuffle algorithm as noted above based on sensor results and configuration data.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
sensing a force applied to a sensor of an audio playback system, the audio playback system comprising a housing and disposed within the housing, a processor; a memory in communication with the processor; and the sensor, the sensor in communication with the processor, and the force comprising an amplitude;
determining a motion of the sensor from the force and determining a frequency of repetition for the motion;
determining a motion of the audio playback system based on the motion of the sensor and the frequency of repetition for the motion of the sensor;
selecting a genre of audio items based on the motion of the audio playback system;
selecting a subset of audio items available to the audio playback system based on the genre;
selecting by the audio playback system an audio content item from the subset; and
playing the selected audio content item.

2. The method set forth in claim 1, further comprising sensing an environmental factor other than the force.

3. The method set forth in claim 1, further comprising sensing an environmental factor, wherein the environmental factor comprises ambient audio, and wherein the audio playback system is further configured to identify the subset of audio items based on a tempo of the ambient audio and tempo data for the audio content item.

4. The method set forth in claim 1, further comprising sensing an environmental factor, wherein the environmental factor comprises a physiological statistic of a user of the audio playback system, and wherein the audio playback system is further configured to identify the subset of audio items based on the physiological statistic of the user and tempo data for the audio content item.

5. An audio playback system comprising:
a housing, and disposed within the housing:
a processor;
a memory in communication with the processor; and
a sensor in communication with the processor,
wherein the memory embodies program components comprising:
a measurement module that configures the playback system to use the sensor to sense a force applied to the sensor, the force comprising an amplitude, and to determine a motion of the audio playback system based on the motion of the sensor and a frequency of repetition for the motion;
an identification module that selects a genre of audio items based on the motion of the audio playback system, and selects a subset of audio content items available to the audio playback system based on the genre;
a selection module that configures the playback system to select an audio content item from the subset of audio content items based on the amplitude of the force and a volume of the audio content item, and
an audio playback module that configures the playback system to access data representing the selected audio content item and use the data to provide audio output.

6. The audio playback system set forth in claim 5, wherein the sensor comprises at least one accelerometer.

7. The audio playback system set forth in claim 5, wherein the sensor is housed in a first component separate from a second component that houses the memory.

8. The audio playback system set forth in claim 5, wherein the processor, memory, and sensor are comprised in a portable music player or wearable device.

9. A non-transitory computer-readable medium embodying program code executable by a computing system, the program code comprising:
program code for causing the computing system to sense a force applied to a component of the computing system, the force comprising an amplitude;
program code for causing the computing system to determine a motion of the component from the force and determining a frequency of repetition for the motion;
program code for causing the computing system to determine a motion of an audio playback system based on the motion of a sensor and the frequency of repetition for the motion of the sensor;
program code for causing the computing system to select a genre of audio items based on the motion of the audio playback system;
program code for causing the computing system to select a subset of audio items available to the audio playback system based on the genre; and
program code for causing the computing system to select a content item for playback from the subset; and
program code for causing the computing system to play the selected content item.

10. The non-transitory computer readable medium set forth in claim 9, further comprising sensing an environmental factor other than the force.

11. The non-transitory computer readable medium set forth in claim 10,
wherein the environmental factor comprises a physiological statistic of a user of the audio playback system, and
wherein the selection of the content item is based on determining which available content items can move a value of the physiological statistic towards a target value.

* * * * *